United States Patent

Hamlin

[11] Patent Number: 5,574,964
[45] Date of Patent: Nov. 12, 1996

[54] SIGNAL DISTRIBUTION SYSTEM

[75] Inventor: Christopher L. Hamlin, Cupertino, Calif.

[73] Assignee: Apple Computer, Inc., Cupertino, Calif.

[21] Appl. No.: 453,871

[22] Filed: May 30, 1995

[51] Int. Cl.⁶ ................................. H04N 7/10
[52] U.S. Cl. ................ 455/3.1; 348/6; 348/8; 348/13; 348/12
[58] Field of Search ................ 348/6–12, 13, 348/14; 455/3.1

[56] References Cited

U.S. PATENT DOCUMENTS

| | | | |
|---|---|---|---|
| 4,031,543 | 6/1977 | Holz | 348/8 X |
| 4,057,829 | 11/1977 | Moorehead | 348/8 |
| 4,484,218 | 11/1984 | Boland et al. | 348/11 |
| 4,633,462 | 12/1986 | Stifle et al. | 348/11 X |
| 4,885,803 | 11/1989 | Hermann et al. | 348/8 X |
| 4,995,078 | 2/1991 | Monslow | 348/7 X |
| 5,136,411 | 8/1992 | Paik et al. | 348/10 |
| 5,281,494 | 7/1993 | Wachole | 348/8 X |
| 5,318,450 | 6/1994 | Carver | 348/8 X |
| 5,359,419 | 10/1994 | Kawasaki | 348/6 |
| 5,404,393 | 4/1995 | Remillard | 348/6 X |
| 5,410,343 | 4/1995 | Coddington et al. | 348/7 |
| 5,432,542 | 7/1995 | Thibadeau et al. | 348/6 |
| 5,440,335 | 8/1995 | Beveridge | 348/13 |
| 5,446,490 | 8/1995 | Blahut et al. | 348/10 |

FOREIGN PATENT DOCUMENTS 2662895  5/1990  France ................ H04N 7/18

Primary Examiner—Victor R. Kostak
Assistant Examiner—Nathan J. Flynn
Attorney, Agent, or Firm—Carr, DeFilippo & Ferrell

[57] ABSTRACT

A signal distribution system having a converter with input terminals for receiving signals of varying configurations and an output terminal for transmitting converted signals. The input signals received by the converter are each converted into a converted signal frequency component of a common bus signal, which is then transmitted by the converter. The converter output terminal transmits the common bus signal on a communication bus. The communication bus is coupled to at least one interface pod for receiving the common bus signal and re-transmitting a desired converted signal.

22 Claims, 5 Drawing Sheets

SIGNAL DISTRIBUTION SYSTEM

BACKGROUND OF THE INVENTION

1. Field of the Invention

The present invention relates generally to distribution of multiple signals, and more particularly to distribution of multiple received signals having differing formats using a single, pre-existing network.

2. Discussion of the Prior Art

As mass communication technology develops, more and more diversified mass communication mediums are becoming available to average consumers. Currently available mass communication formats or mediums include satellite communication, Asynchronous Transfer Mode (ATM), Integrated Services Digital Network (ISDN), Global System for Mobile telecommunications (GSM), Cellular Digital Packet Data (CDPD), Personal Communications Service (PCS), and Advanced Digital Subscriber Loop (ADSL), as well as cable television (TV), movie channels, and conventional radio and television broadcasts picked up by large antenna arrays. Additional communication formats or mediums under development include interactive home shopping, interactive games, interactive television, electronic banking and bill payment systems, and interactive digital communications.

Many of these communication formats or mediums are very different from one another. As more diversified mass communication resources become available, consumers repeatedly need to purchase upgrade components to enable their systems to interact and communicate with the proliferating types signals used by these resources.

For example, a typical home owner having a standard home entertainment system may soon need the following reception equipment: a large external antenna for reception of commercial television and radio signals, a cable box connected to a hard wired-cable network for receiving cable TV channels, radio frequency (RF) modems, telephony modems, digital telephone line interfaces, satellite signal receiving antennas, and fiber optic ports. Each time a service with a new format becomes available to the home owner, new receiving equipment is required to make his or her current system compatible with the new service. Incompatibilities between types, formats or configurations of signals used are a significant limitation in the prior art. A typical consumer could quickly become frustrated by ongoing requirements to update his or her equipment. Moreover, due to the large amount of video, audio, and various other types of electronic mass media information available to consumers, home owners commonly have several televisions, video cassette recorders (VCR's), and radios spread through their homes.

Accordingly, it would be desirable to have a system and method for using a single, pre-existing network to distribute multiple received signals having differing formats, using a single, preexisting network. It also would be desirable to provide a system that enables all the received communication signals to be distributed to various locations within a structure without having to provide special reception equipment at each specific location. Furthermore, it would be desirable to provide a system that can be easily modified to accommodate additionally received signals of new types or formats.

SUMMARY OF THE INVENTION

The present invention overcomes the aforementioned shortcomings of the prior art by providing a system and method for using a single, preferably preexisting network to distribute multiple received signals having differing formats. The invention enables all received communication signals to be distributed to various locations within a structure without requiring unique reception equipment at each of the specific locations. The system may be modified easily to accommodate additional received signals having new formats.

The invention includes a converter with input terminals for receiving distinct signals of various signal formats or types and an output terminal for transmitting converted signals. The converter converts each of the distinct input signals into a separate converted frequency signal which becomes a component of a common bus signal, which the converter transmits. A communication bus is coupled to the output of the converter, and the communication bus carries the common bus signal transmitted by the converter. At least one interface pod is coupled to the communication bus for receiving the common bus signal and, in response to an inputted control signal, transmits a requested separate converted frequency signal. The apparatus further includes a system controller which, in response to an inputted command signal, outputs a control signal on the communication bus directing an interface pod at a specific location to transmit a requested separate converted frequency signal to a receiving unit.

The method of the invention includes the steps of receiving distinct input signals of various configurations and frequencies and converting the received input signals into separate converted frequency signal components of a common bus signal. The converted frequency signals are broadcast on a communication bus to at least one interface pod. In response to an inputted control signal, an interface pod transmits a requested separate converted frequency signal from the communication bus.

DETAILED DESCRIPTION OF THE PREFERRED EMBODIMENTS

Figure 1:
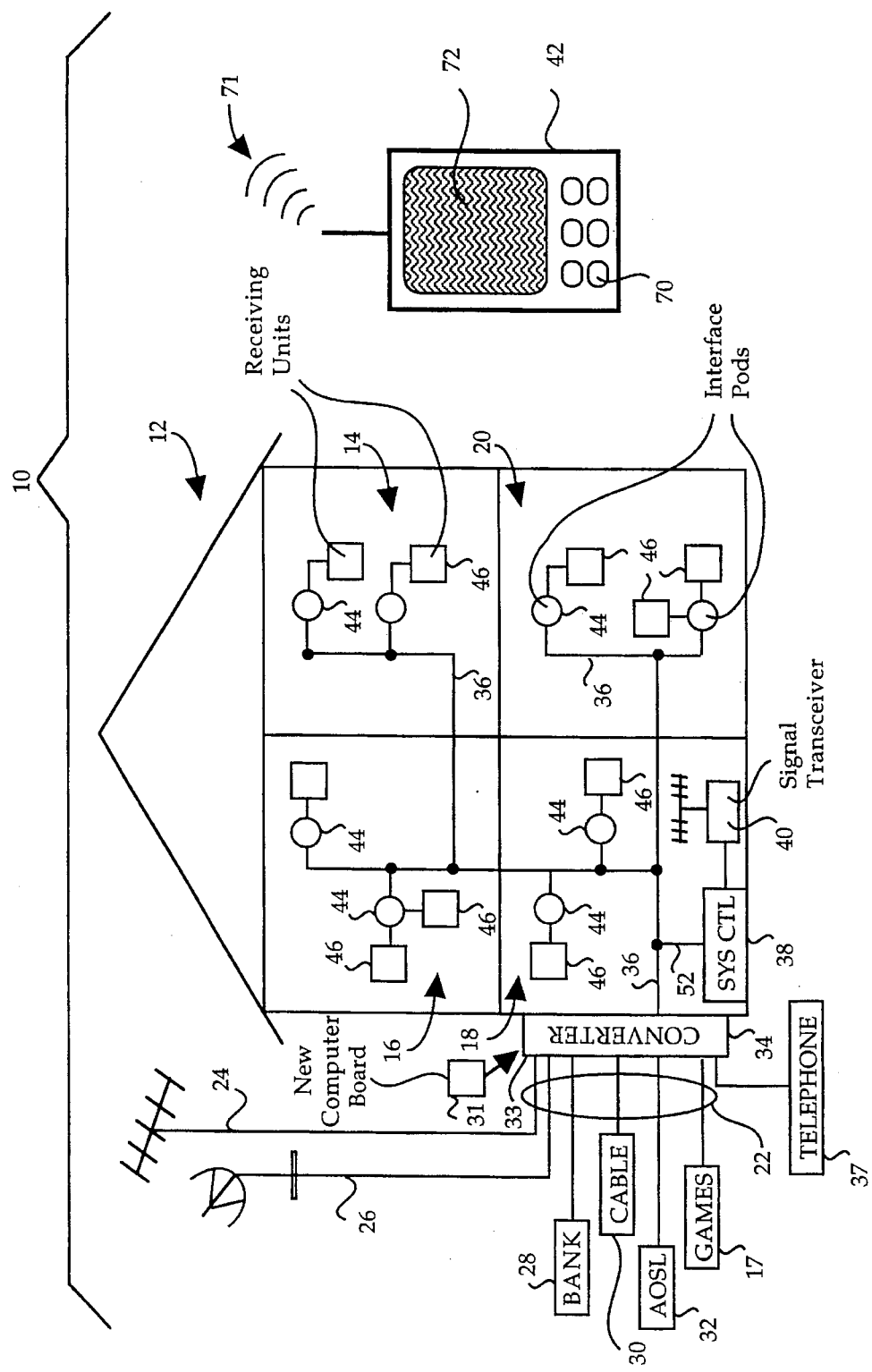
FIG. 1 is a block diagram of a residence building incorporating a signal distribution system of the present invention.

FIG. 1 is a block diagram illustrating an example residence dwelling or home 12 incorporating the signal distribution system 10 of the present invention. The invention may be incorporated in almost any structure or structures.

The home 12 has a parents' bedroom 14, a children's bedroom 16, a den 18, and a family room 20. Numerous mass media signals 22 are being received from outside home 12. These mass media signals consist of various types of signals, such as television signals, ADSL signals, GSM signals, and the like. Mass media signals 22 are received by the home 12 via a standard television aerial 24, a satellite dish 26, a banking network line 28, a cable television line 30, an Advanced Digital Subscriber Loop (ADSL) line 32, an interactive game network line 17, and even a telephone line 37. At least several of the signals 22 are received on different signal mediums and at different frequencies.

In accordance with the present invention, the received distinct input media signals 22 are all received by a converter 34 wherein the media signals 22 of various signal types are converted into a respective converted frequency signal that is transmitted along a communication bus 36 throughout the house 12. The converter 34 can be located outside or inside home 12. The communication bus 36 can be any communication bus network, however, the present invention is specifically designed to utilize coaxial cable television networks already existing in many homes.

The communication bus 36 provides a network access to each of the rooms 14, 16, 18, 20 in house 12. A system controller 38 and multiple interface pods 44 are also coupled to the communication bus 36. Each interface pod 44 typically has coupled to it one or two receiving units 46, such as a television and/or a video cassette recorder.

The invention also includes a hand-held remote controller 42 capable of being carried around the house 12. The remote controller 42 transmits signals to, and receives signals from, a signal transceiver 40 which is coupled to the system controller 38.

Figure 2:
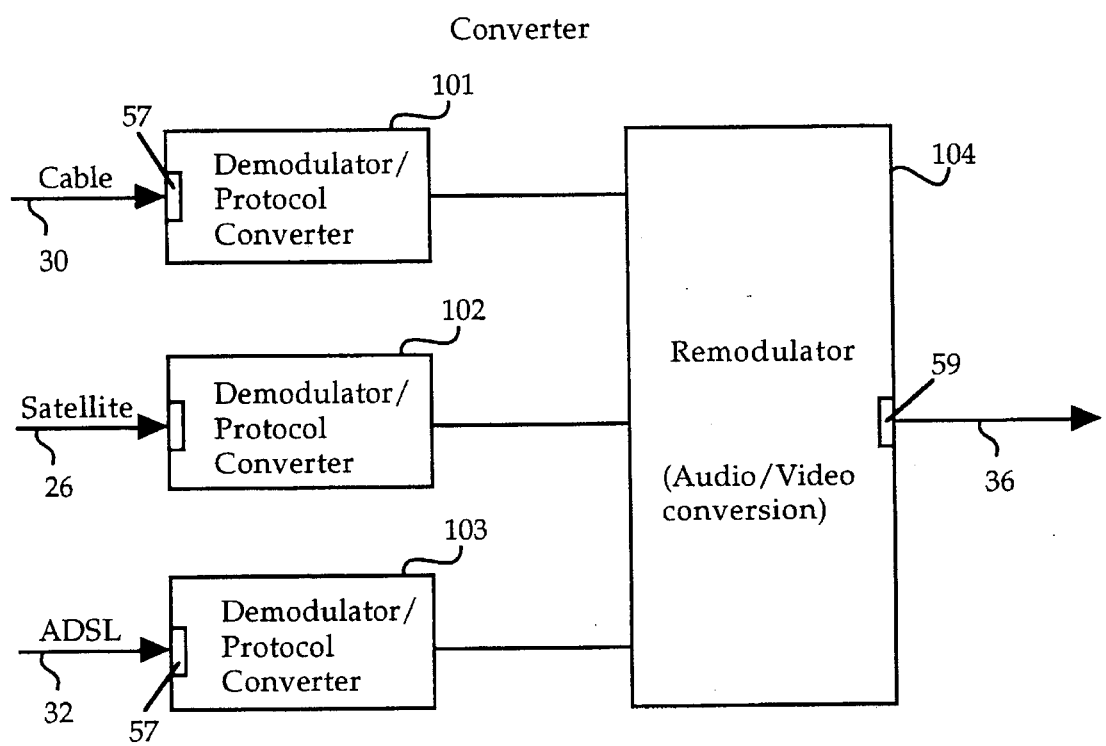
FIG. 2 is a block diagram of a converter in accordance with the invention.

FIG. 2 is a block diagram illustrating converter 34 components for converting signals received from the cable line 30, the satellite line 26, and the ADSL line 32, and transmitting the signals in common bus signals on the communication bus 36. Converter 34 includes a series of demodulator/protocol converters 101, 102, 103, etc., and a remodulator 104. The converter also includes numerous input terminals 57 connected to respective input signal lines, and an output terminal 59 connected to the communication bus 36. The converter 34 receives different types of signals and performs protocol conversion and/or demodulation as necessary to produce signals in a common format, but of different frequencies which are then transmitted onto the communication bus 36.

For example, signals carried on the ADSL line 32 are received by the demodulator/protocol converter 103 and converted into a common intermediate format, which is next received by the remodulator 104. The remodulator 104 remodulates the intermediate format signal into a predetermined frequency band component of the common bus signal, previously assigned to each type of incoming signal, which is carried by the communication bus 36. Accordingly, each distinct input signal received by the converter 34 is carried in a different frequency band of the common bus signal on the communication bus 36. If a new signal is to be received by the converter 34, a new demodulator/protocol converter suitable to receive and convert the new received signal is added to the converter 34. The demodulator/protocol converters are preferably hard cards which are inserted into available slots 33 of the converter 34 to update the converter 34.

Figure 3:
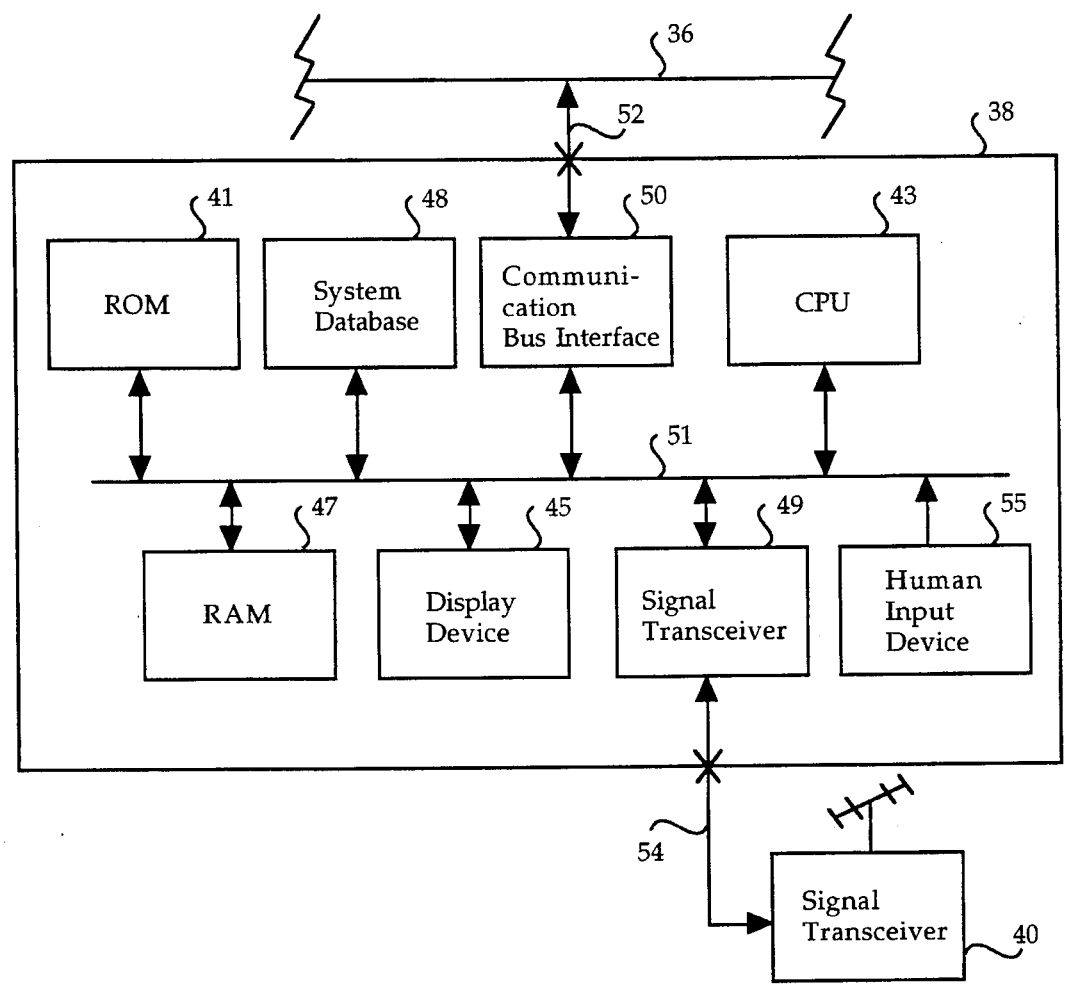
FIG. 3 is a block diagram of a system controller and signal transceiver of the invention.

FIG. 3 is a block diagram illustrating the system controller 38 and the signal transceiver 40. The system controller 38 is coupled to via bi-directional bus 52 to the communication bus 36, and via bi-directional line 54 to the signal transceiver 40. The system controller 38 is preferably a personal computer having a central processing unit (CPU) 43, a display device 45, a human input device 55, a random access memory (RAM) 47, a read-only memory (ROM) 41, a communication bus interface 50, a system database 48, and a signal transceiver interface 49 coupled together in a von Neuman architecture via bus 51.

The signal transceiver 40 is preferably a low power frequency-hopping spread spectrum radio frequency (RF) packet radio receiver, which employs Reed-Solomon or comparable error correction and operates in a preferably 2.4 gigahertz spectrum, receiving signals transmitted from an area within a radius on the order of 100 meters.

The communication bus interface 50 converts common bus signals received from the communication bus 36 into a format compatible to the system controller 38. Bus interface 50 also converts signals sent from the system controller 38 into a format compatible to the common bus signal. The communication bus interface 50 contains a radio frequency (RF) modulator-demodulator (modem) and digital line protocol engine which translate control commands and data between analog form for communication via bus 52 to or from the pods 46, and digital form for communication via bus 51 to or from the system controller 38.

A system database storage 48, such as a disk drive, within the system controller 38 holds information on the status of the distribution system 10. The system database 48 stores each frequency of the common bus signal to which an incoming signal has been converted, interface pod address locations, addresses of all receiving locations, and type of receiving unit 46 coupled to each interface pod 44. Essentially, the system database 48 stores all information necessary for the system controller 38 to identify the location of all components of the signal distribution system 12, and to monitor whatever activity is occurring at each location.

Figure 4:
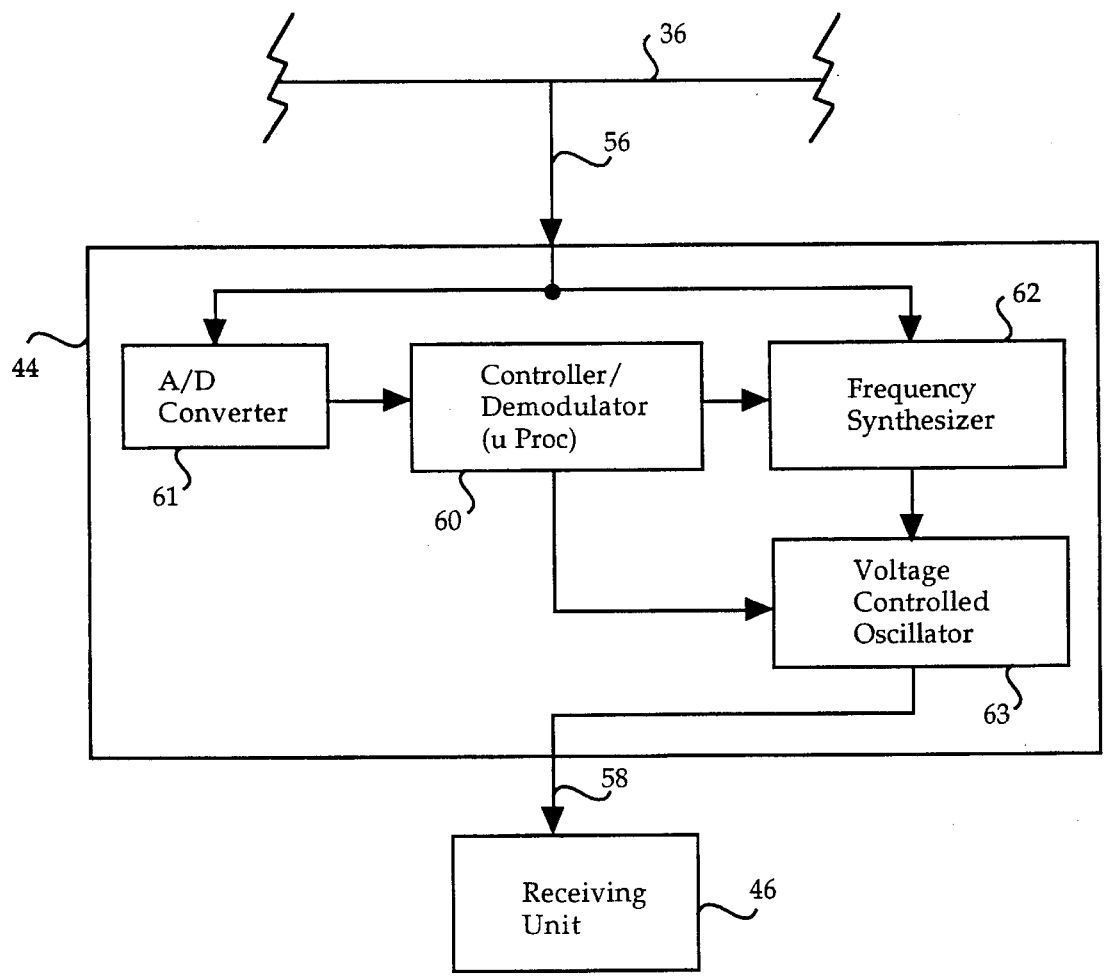
FIG. 4 is a block diagram of an interface pod and receiving unit of the invention.

FIG. 4 is a block diagram illustration of the interface pod 44 and the receiving unit 46. The interface pod 44 is coupled via bi-directional line 56 to the communication bus 36, and coupled via line 58 to the receiving unit 46. The receiving unit 46 can be a television (TV), video cassette recorder (VCR), stereo-equipment, or audio equipment.

The interface pod 44 includes an analog-to-digital (A/D) converter 61, a microprocessor controller/demodulator 60, a frequency synthesizer 62, and a voltage controlled oscillator 63. The common bus signal on line 56 is received by the A/D converter 61, converted and passed to the controller/demodulator microprocessor 60. The common bus signal is also received by the frequency synthesizer 62. Upon receiving the converted common bus signal, the microprocessor 60 interprets the pod address and command instruction component of the common bus signal. If the pod address matches that of the receiving interface pod 44, the microprocessor 60, in accordance with the accompanying command instruction, directs the frequency synthesizer 62 to forward a requested frequency signal component of the common bus signal to the voltage controlled oscillator 63. The voltage controlled oscillator 63, under the control of the microprocessor 60, transmits the requested and directed signal at a compatible voltage to the receiving unit 46.

Figure 5:
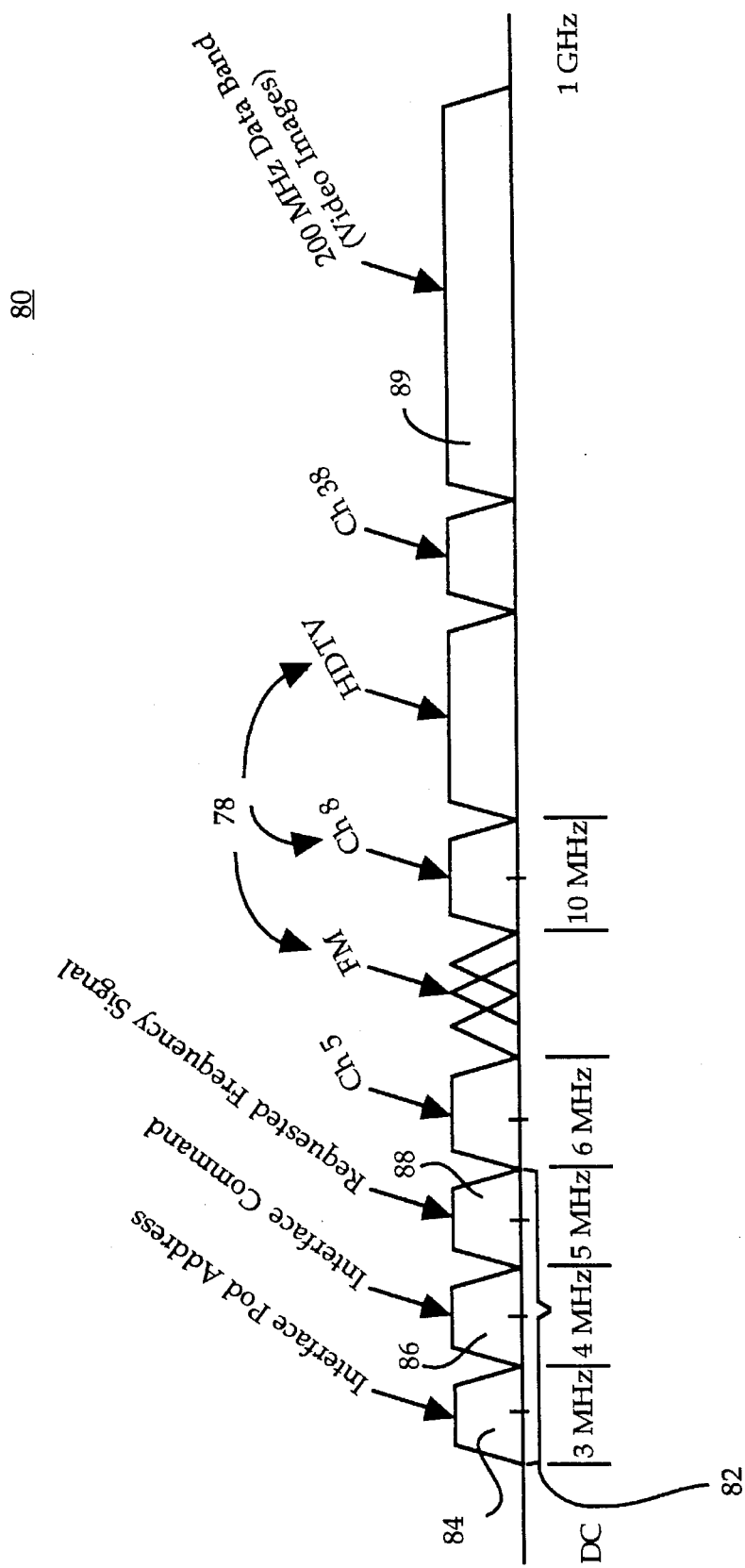
FIG. 5 is a frequency diagram of a common bus signal of the invention.

FIG. 5 is a frequency diagram illustrating frequency band components of the common bus signal 80. The common bus signal 80 is a broad frequency band analog signal between zero hertz (0 Hz) and one gigahertz (1 GHz). As discussed above, the mass media signals 22 are each converted by the converter 34 into a separate converted frequency signal 78 component of the common bus signal 80. Band widths of each converted frequency are appropriate for each type of converted signal. In addition, the system controller 38 outputs a control signal 82 that includes an interface pod address signal 84, an interface command signal 86, and a requested frequency signal 88 as components of the common bus signal 80.

FIG. 5 illustrates several labelled separate converted frequency signals. For example, the interface pod address 84 frequency is at 3 MHz, the interface command 86 frequency is at 4 MHz, and the requested frequency signal 88 is at 5 MHz. Of the separate converted frequency signals, TV channel 5 is converted to 6 MHz and TV channel 8 is converted to 10 MHz. Of course, the media signals 22 and signals provided by the system controller 38 can be carried at any otherwise unassigned frequency within the 1 GHz range in the common bus signal 80.

Operation Example

Referring again to FIG. 1, before a signal distribution system 10 is installed, a house 12 preferably has a signal line 30 through which it receives basic cable TV service, and has conventional cable TV wiring 36, preferably coaxial cable, which distributes TV signals throughout house 12. The basic cable TV wiring will be used as the communication bus 36.

To implement the invention, a home owner assembles a system controller 38, a converter 34, a signal transceiver 40, several interface pods 44, and a remote controller 42. The signal transceiver 40 is connected to the system controller 38. The external cable TV signal line 30 is connected to the converter 34, and the converter 34 output terminal is connected to the cable wiring input terminal of the house 12. The interface pods 44 are connected via lines 56 to conventional cable wiring jacks at desired locations throughout the house 12. The interface pods 44 are connected via respective lines 58 to receiving units 46 (TVs, VCR, etc.). These simple steps complete the hardware installation of the present invention.

To program the signal distribution system 10, the system controller 38 is loaded with data on the types of mass media signals 22 to be input to the converter 34, the locations of the interface pods 44, and the type of receiving unit 46 coupled to each interface pod 44. A user interacts either indirectly through the remote controller 42 or directly through the system controller 38 to program the signal distribution system 10. The interactive remote controller 42 enables the system controller 38 through user-friendly prompts to provide necessary programming information. The remote controller 42 includes a keypad 70 for entering commands and responding to prompts, and a small visual display 72 for displaying data, system status, and requested information. Thus, the remote controller 42 can, from anywhere within the operational radius, control or even program the signal distribution system 10.

Once the signal distribution system 10 is programmed, a user can use the remote controller 42 to direct any mass media signal 22 to be distributed to any room 14, 16, 18, 20 in house 12. For example, assume a parent in the family room 20 is watching TV while a first VCR in the den 18 is recording a football game on channel 8, and a second VCR in the bedroom 14 is recording a basketball game on channel 10. The parent suddenly remembers that he or she was supposed to record a movie on channel 5. If the house has only two VCRs, and the parent decides that the basketball game is less important than the football game, he or she can push a button on the remote controller 42 and cause the interface pod 44 in the bedroom 14 to start passing the channel 5 movie onto the second VCR for recording.

Later, at 9:00 p.m., it is time for the children to turn off the TV in their bedroom 16 and go to sleep. With the touch of a button on the keypad 70, the parent sends a "sleep" command to the interface pod 44 in the children's room 16, so that only "Go to Bed" will be displayed by that TV.

Finally, before going to bed, the parent wants to check stock reports on an internet banking system accessible via the telephone line 37. With a push of a button on keypad 70, and without leaving the couch, the system controller 38, via a modem in the converter 33, dials into the banking internet, retrieves the current stock reports, and then transmits the visual display of the stock reports over the communication bus 36 to the interface pod 44 in the family room 20, where the stock reports are displayed by a TV.

In each of the above examples, the signal distribution system 10 executes a procedure as follows. First, a command is entered via keypad 70 into the remote controller 42, which then transmits a command signal 71 via electromagnetic radiation, such as an infrared or radio signal, to the signal transceiver 40. The transceiver 40 then converts the received electromagnetic signal into an electrical signal on line 54 to the system controller 38 which interprets the line 54 signal and responsively outputs a control signal 82 onto communication bus 36.

A control signal 82 includes three components as shown in FIG. 5: an interface pod address 84, an interface command 86, and a requested signal frequency command 88. Therefore, in the above example when the parent wishes for the bedroom 14 VCR to start recording the channel 5 movie instead of the channel 10 basketball game, the parent sends an interface command signal 71 to the system controller 38 which responds by transmitting a control signal 82 including an interface pod address 84 identifying the bedroom 14 interface pod 44, an interface command 86 to start receiving a new signal, and a requested signal frequency 88 identifying TV broadcast channel 5.

Every interface pod 44 receives the control signal 82, but only the interface pod 44 having the specified address responds to the control signal 82. In the preferred embodiment, the microprocessor 60 of the interface pod 44 functions as an address recognition unit. After the bedroom 14 interface pod 44 recognizes that it is the addressee of the control signal 82, it reads the interface command 86 and the requested signal frequency 88, and responds by transmitting channel 5, already carried as a specific frequency component of the common bus signal 80, from the communication bus 36 and in a VCR-compatible format to the second VCR. Since the interface pod 44 determines which signals are received by the VCR, the VCR channel does not need changing. Similarly, all receiving units 46 remain fixed on some input channel, for example channel 3, and the interface pod 44 transmits requested signals in channel 3 format to the receiving unit 46.

In the example above involving the children's bedroom 16, the parent enters a command on the remote controller 42 keypad 70, and in response, the remote controller 42 transmits an electromagnetic signal 71 that is picked up by the signal transceiver 40 and relayed on line 54 to the system controller 38. In response, the system controller 38 transmits, onto the communication bus 36, a control signal 82 including the appropriate interface pod address 84, the interface command 86, and the requested signal frequency 88 which the interface pod 44 is requested to output to the receiving unit 46. In this case however, the requested signal to be outputted is not a TV channel, but a video image "Go to Bed" signal 89 from the system controller 38. This video signal 89, like a TV channel, is assigned to be a respective predetermined frequency component of the common bus signal 80. In FIG. 5, the video signal 89 originating from the system controller 38 is illustrated as occurring at the 200 MHz Data Band of the common bus signal 80. The interface pod 44 simply transfers the requested separate converted frequency 78 in a compatible format to the receiving unit 46.

In the example above involving stock reports, the same procedure is followed, via the phone line 37 into a banking network. The stock data received via phone line 37 is outputted by the system controller 38 in the common bus signal 80. The control signal 82 includes the family room 20 interface pod 44 address 84, the interface command signal 86 instructing the interface pod 44 to begin transmitting, and the requested signal frequency 88 directing the interface pod 44 to separate desired stock report frequency signal 78 to be forwarded to the associated TV.

The signal distribution system 10 of the present invention provides a convenient and increased capability for distributing incoming signals throughout a home. Moreover, with the converter 34, a home owner will not need to purchase new equipment to be compatible with new incoming mass media signals 22. Any type of distinct inputted mass media signal 22, of any communication medium, can be converted by the converter 34 into the format of the common bus signal 80. After the installation of the converter 34, even if an unanticipated mass media signal 22 configuration develops, and cannot be converted by the current version of the converter 34, the converter 34 can be upgraded simply.

The converter 34 includes expansion slots 33 for simplified modification. A home owner need only purchase and install a new computer board 31 to update the compatibility of the converter 34. The system controller 38, via the same programming procedure, is updated to reflect the modification of as to the converter 34. Thus, the entire signal distribution system 10 can be updated without the purchase of any new receiving unit 46 or interface pods 44.

Similarly, if a receiving unit 46 is moved to a different location within house 12, the system controller 38 is simply reprogrammed to reflect the new address. The system controller 38 will be informed of any new receiving unit 46 locations, and accordingly modify the system database 48.

The signal distribution system 10 of the present invention can accommodate both digital and analog signals. While designed primarily to be installed economically using cable TV coaxial cable as the communication bus 36, special equipment can be used for more sophisticated systems. For example, fiber optics could be used as the communication bus 36 in combination with a fiber optic converter 34.

The invention has been explained with reference to specific embodiments. Other embodiments will be apparent to those of ordinary skill in the art in light of this disclosure. Therefore, it is not intended that this invention be limited except as indicated by the appended claims.

I claim:

1. A signal distribution system for transmitting multiple input signals on a common signal transfer medium to various receiving units, the system comprising:

a converter including
a first receiving channel having
first input terminals for receiving, from a first signal transfer medium, first input signals having a first format which is dedicated to a first type of receiving unit; and
a first translator for converting the first input signals to first converted signals in a common format;
a second receiving channel having
second input terminals for receiving, from a second signal transfer medium, second input signals having a second format which is different than the first format and is dedicated to a second type of receiving unit; and
a second translator for converting the second input signals to second converted signals in the common format;

a device coupled to the common signal transfer medium, for transmitting the first and second converted signals on a common signal transfer medium to the receiving units;

a common signal transfer medium, connected to the device, for carrying the common format converted signals; and a system controller coupled to the common signal transfer medium and enabling a user to select one of the converted signals for delivery to one of the receiving units.

2. The signal distribution system of claim 1, further comprising a first interface pod, connected to the common signal transfer medium, for receiving a converted signal and transmitting the signal in the first format for use by a first receiving unit.

3. The signal distribution system of claim 2, further comprising:

a remote controller for transmitting a command signal requesting the first interface pod to transmit the first converted signal; and a signal receiver, coupled to the first interface pod, for receiving the command signal from the remote controller and responsively relaying command signal information to the first interface pod.

4. The signal distribution system of claim 2, wherein the system controller is responsive to a received command signal to transmit on the common signal transfer medium a control signal which directs the first interface pod to transmit the first converted signal.

5. The signal distribution system of claim 4, wherein the system controller includes a database which stores input signal conversion protocols, signal transfer medium destinations, identification codes for respective input signals, and interface pod addresses;

the control signal includes an interface pod address and a desired signal frequency; and the first interface pod includes an address recognition unit for recognizing the first interface pod address and said identification codes.

6. The signal distribution system of claim 4, further comprising:

at least one remote controller for transmitting a command signal which requests the first interface pod at a first address to transmit the first converted signal; and a signal receiver coupled to the system controller for receiving command signals from the remote controller and relaying the command signal information to the system controller.

7. The signal distribution system of claim 4, including a first receiving unit coupled to said first interface pod, and wherein said first interface pod transmits the first converted signal in a compatible format to said first receiving unit.

8. The signal distribution system of claim 4, wherein the system controller includes an input device for manually entering the command signal.

9. The signal distribution system of claim 4, wherein the system controller transmits a video signal in the converted signals.

10. The signal distribution system of claim 4, wherein the system controller further comprises a controller interface which enables the system controller to transmit signals compatible with the converted signals.

11. The signal distribution system of claim 4, wherein the converter includes a modem for converting received telephone line signals into signals compatible with the converted signals.

12. The signal distribution system of claim 4 wherein the system controller is a personal computer.

13. The signal distribution system of claim 2, wherein the common signal transfer medium comprises a coaxial cable.

14. The signal distribution system of claim 6, wherein the remote controller includes an input device for manually entering a command.

15. The signal distribution system of claim 6, wherein the command signal is transmitted via electromagnetic radiation.

16. The signal distribution system of claim 6, wherein the command signal is transmitted via local range FM radio.

17. The signal distribution system of claim 2, further comprising a second interface pod for receiving a converted signal for use by a second receiving unit.

18. A method of distributing signals on a common signal transfer medium to various receiving units, comprising the steps of:

receiving input signals having various formats dedicated to respective types of receiving units;

converting the input signals into converted signals having a common format;

broadcasting the converted signals on a common signal transfer medium; and enabling a user to select one of the converted signals for delivery to one of the receiving units.

19. The method of distributing signals as in claim 18, further comprising the steps of:

receiving the converted signals from the common signal transfer medium;

generating a command signal, using a remote controller to a system controller for generating configuration signals;

delivering the configuration signals to an interface pod;

converting a selected portion of the converted signals, based on the configuration signals, to a format for use by a receiving unit; and forwarding the selected portion to the receiving unit which is coupled to the interface pod.

20. The method of distributing signals as in claim 19, further comprising the step of including an interface pod address in the control signal and decoding the interface pod address to determine whether the control signal is directed towards the interface pod.

21. A signal distribution system for delivering multiple input signals on a common signal transfer medium to various receiving units, comprising:

means for receiving input signals of various formats dedicated to respective types of receiving units;

means for converting the received input signals into converted signals forming components of a common format signal;

means for broadcasting the common format signal on a common signal transfer medium.;

interface pod means for receiving a portion of the common format signal from the common signal transfer medium and transmitting the portion to a receiving unit; and a system controller enabling a user to select the portion of the common format signal for delivery to one of the receiving units.

22. A system for distributing multiple input signals on a common signal transfer medium to a first receiving unit of a first type and to a second receiving unit of a second type, comprising:

(a) a converter including
 (1) a first channel having
  (i) analog input terminals for receiving an analog input signal of a first format compatible with the first receiving unit; and
  (ii) an analog translator for converting the analog input signal to a first converted signal in a first selected frequency band of a first selected width in a common format;
 (2) a second channel having
  (i) digital input terminals for receiving a digital input signal of a second format compatible with the second receiving unit; and
  (ii) a digital translator for converting the digital input signal to a second converted signal in a second selected frequency band of a second selected width in the common format; and
 (3) a modulator for transmitting the first and second converted signals on the common signal transfer medium;

(b) a first interface pod, coupled to the common signal transfer medium and to the first receiving unit, responsive to selected control signals received via the common signal transfer medium, for translating converted signals to the format for use by one of the receiving units;

(c) a second interface pod, coupled to the common signal transfer medium and to the second receiving unit, responsive to selected control signals received via the common signal transfer medium, for translating second converted signals to the second format for use by the second receiving unit; and (d) a system controller enabling a user to select a respective one of the converted signals for translation by each interface pod.

* * * * *